UNITED STATES PATENT OFFICE.

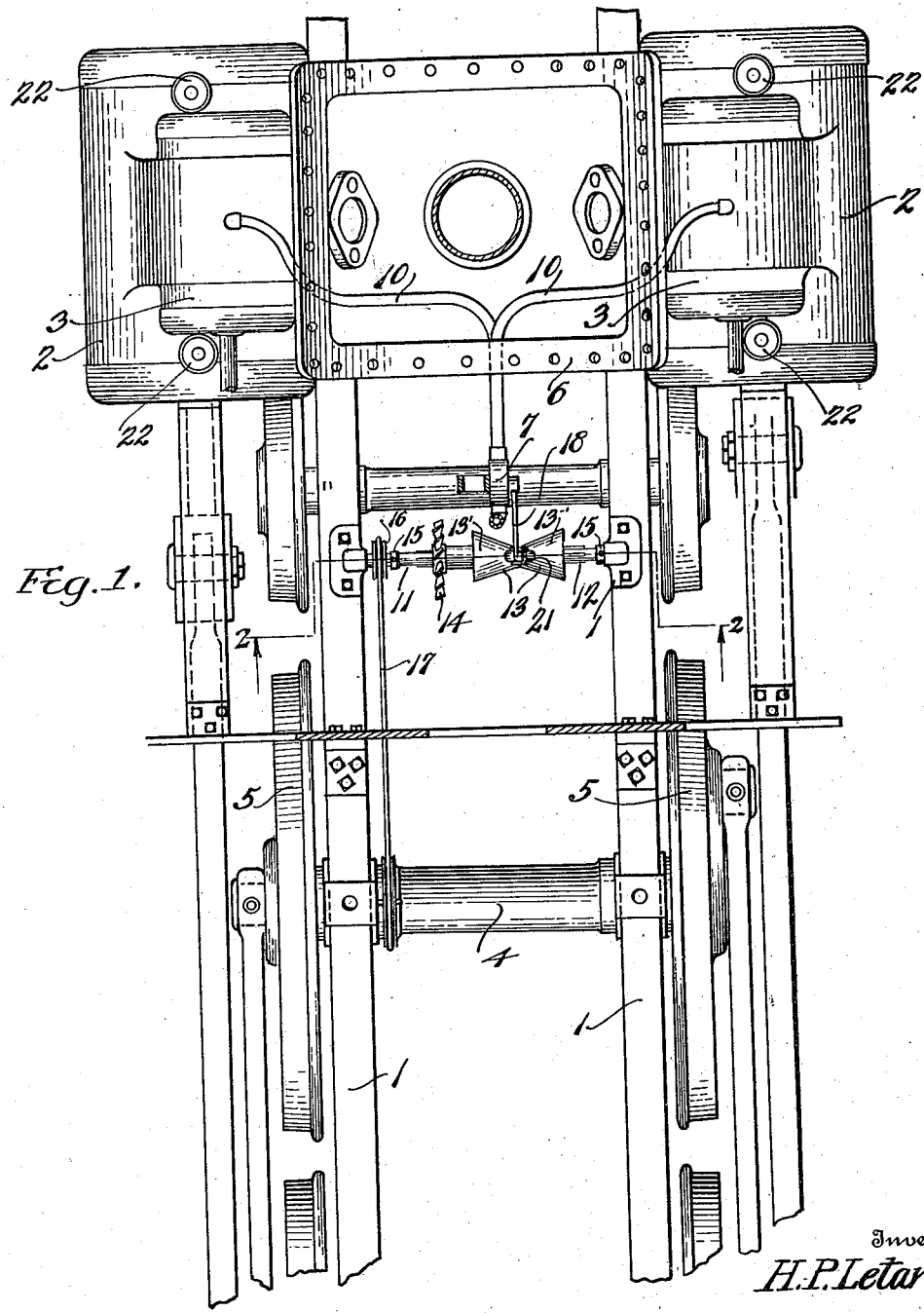

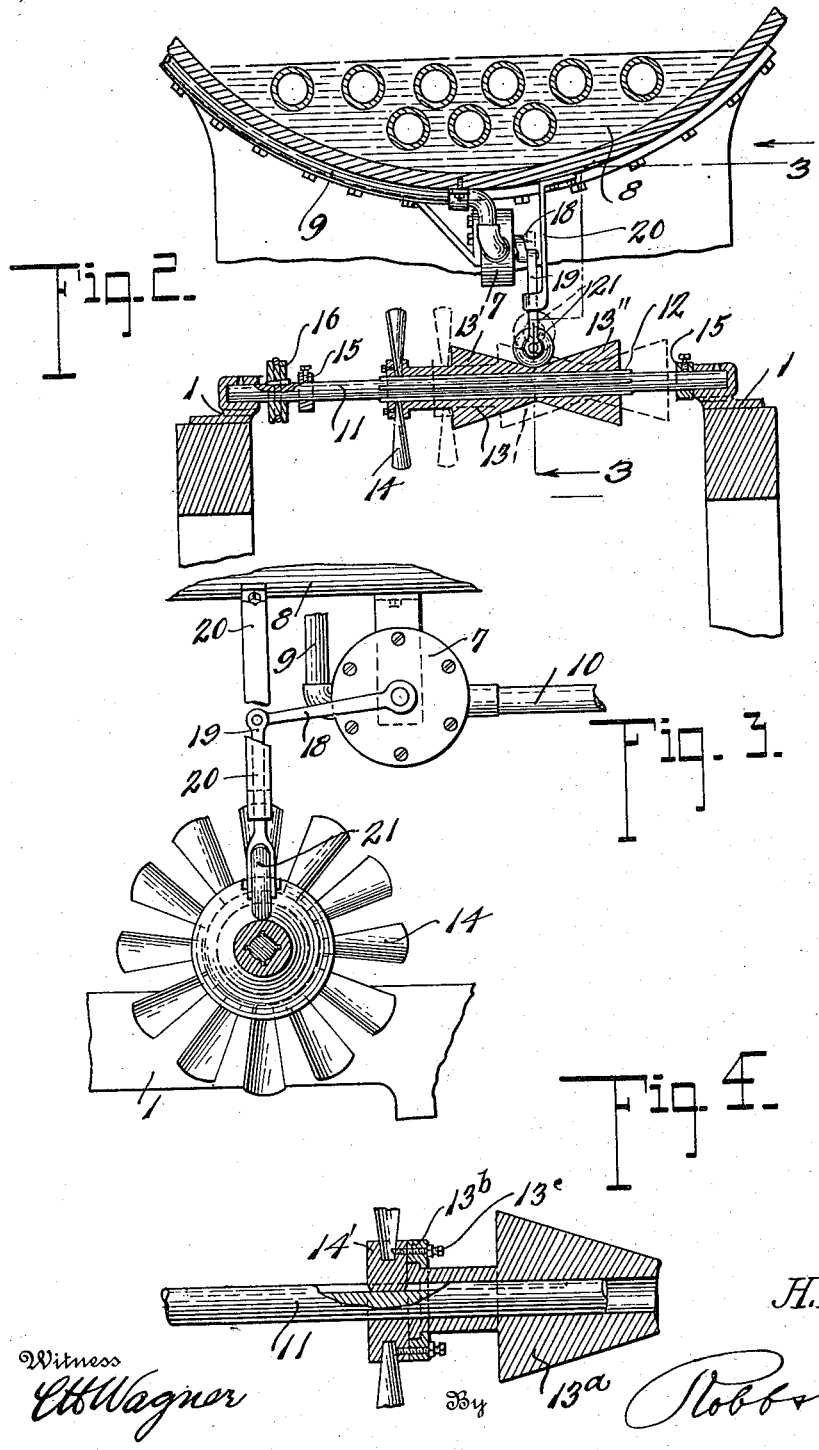

HENRY P. LETART, OF ALBURG, VERMONT.

DRIFTING-VALVE MECHANISM.

1,217,023.　Specification of Letters Patent.　Patented Feb. 20, 1917.

Application filed March 13, 1916. Serial No. 83,892.

*To all whom it may concern:*

Be it known that I, HENRY P. LETART, a citizen of the United States, residing at Alburg, in the county of Grand Isle and State of Vermont, have invented certain new and useful Improvements in Drifting-Valve Mechanism, of which the following is a specification.

The present invention appertains to improvements in drifting valve operating mechanism and has for its object to provide means for automatically operating an auxiliary valve whereby to admit to the cylinders of a steam engine a small quantity of steam especially when said locomotive is "drifting" so as to maintain proper lubrication of the operating parts.

It will be observed, for the sake of clearness, that it is customary when a locomotive has reached a predetermined speed and also when descending grades, to close the engine throttle, thereby cutting off the supply of steam to the cylinders and permitting the locomotive to drift along under its momentum. Where the drifting covers any considerable distance, it is obvious, owing to the discontinuance of the steam and the consequent inadequacy of the circulation of lubricant, that much wear on the piston rod packings and valve packing rings is incurred.

Again, in addition to the maintenance of a supply of lubricant to the cylinders thereby, the provision of this auxiliary steam supply is designed to hold the relief valves in closed position while drifting, preventing the suction into the cylinders of cold air or heated gases which destroy the oil.

For a full understanding of the present invention reference is to be had to the following description and the accompanying drawings, in which:

Figure 1 is a plan view of a portion of a locomotive frame and cylinders, showing the application thereto of my drifting valve mechanism.

Fig. 2 is a vertical sectional view taken on the plane indicated by the line 2—2 of Fig. 1.

Fig. 3 is a transverse sectional view taken about on the plane indicated by the line 3—3 of Fig. 2.

Fig. 4 is a fragmentary sectional view of a slightly modified form of the cam member used in this apparatus.

Throughout the following detail description, and on the several figures of the drawings, similar parts are referred to by like reference characters.

Referring to the drawings, the numeral 1 indicates the locomotive frame members, 2 the cylinders, and 3 the valve chests therefor. The frame is mounted in the customary manner upon the driving axle 4 and drivers 5. Preferably in rear of the saddle 6 is arranged the drifting valve mechanism forming the subject matter of this invention, said mechanism including a valve 7 of any desirable form and construction and disposed preferably beneath the boiler 8 from which a supply of steam is conveyed by the conduit 9 to said valve. The steam under the control of the valve 7 is directed to the valve chests 3 through suitable conduits 10.

Journaled upon the frame members 1 beneath the valve 7 is a transversely arranged shaft 11, said shaft being provided preferably with one or more projections or keys 12 extending longitudinally of said shaft as best shown in Fig. 2 of the drawing, and upon said keyed portion is mounted a regulator for controlling the operation of the valve 7. This regulator consists essentially of a spool-like cam member 13 suitably grooved to receive the keys 12 on the shaft 11 for connecting the cam member to rotate therewith while permitting free shifting movement of said cam member on the shaft in a manner to be more clearly described hereinafter.

It will be understood that the cam member 13 consists of opposing conical-shaped cam elements 13′, 13″, the surfaces of which incline upwardly and away from the center of the cam member. I desire it to be understood that this cam member may have a greater or a less bearing upon the shaft than is illustrated in the accompanying drawings in order to permit of the shifting of said member with the desired amount of freedom, under the control of its actuating instrumentalities.

The cam member 13 carries at one end a fan 14 which is designed to rotate with the shaft 11 and by virtue of the reaction of which the cam member 13 is shifted on the said shaft. Movement of this regulator is limited by any suitable means, such for instance, as the adjustable set collars 15 at opposite sides thereof, and spaced from each other a suitable distance to permit of the desired shifting movement of this element.

The rotatable shaft or support 11 is provided with a grooved pulley 16 driven from the driving axle 4 by any desired means such as the belt 17. The ratio of speed of the shaft 11 with respect to the driving axle 4 is controlled in the usual manner by the diameters of the driving pulleys and this is more or less controlled by the type of locomotive to which the apparatus is connected. In other words, it would be requisite to provide a different ratio of gears for a freight engine from that which would be utilized in a high speed passenger engine.

As noted particularly by reference to Fig. 3, the valve 7 is provided with an arm or lever 18 projecting rearwardly and carrying at its outer end the vertically arranged operating member 19 coöperating with suitable guide means in the form of a bracket 20 depending from the boiler 8. The lower end of the member 19 is bifurcated or forked to receive the bearing wheel 21 which is normally seated at the lowermost point of the cam surfaces 13′, 13″ or in other words in the central depression formed by these conical extremities of the cam 13.

In the operation of the invention it will be apparent that when the locomotive starts to move, the movement of the driving instrumentalities is transmitted to the shaft 11 through the operative connection 17, said shaft being thereby caused to revolve at considerable speed and along therewith the fan 14 is operated. The revolution of the fan in turn, by reason of reaction against the air will tend to force the cam member 13 longitudinally of the shaft in a direction depending, of course, upon the direction of rotation of said fan. Such movement of the cam member 13 laterally with respect to the valve operating member 19 will cause the bearing roller 21 to climb one of the inclined cam surfaces of said cam member. This gradually lifts the operating member 19 and actuates the arm 18 to gradually open the valve 7 and admit steam to the distributing conduits 10 which steam passes into the valve chests 3. Obviously the faster the rotation of the fan 14, the greater the extent of movement of the valve, and therefore, the greater the supply of steam admitted to the chests. It follows from this description that when the locomotive has reached a predetermined speed and it is desired to drift, the main engine throttle may be closed, consequently cutting off the main supply of steam to the cylinders. However, during the drifting of the locomotive the auxiliary supply of steam passes to the chests in a sufficient quantity to maintain proper lubrication of the parts and afford a sufficient pressure to preferably hold the relief valves 22 when such are provided for said cylinders in closed position. As hereinbefore described, this prevents the suction of air or hot gases into the engine cylinders which has its obvious advantages.

As the movement or speed of the locomotive is reduced, the fan necessarily rotates more slowly and owing to the weight of the valve operating member 19 and the inclination of the cam surfaces of the member 13, this operating member tends to shift the cam member back to its normal position where the roller 21 will be seated at the lowermost point of the inclination.

In conclusion, it may be understood from the foregoing description that the purpose of providing a double cam surface for the member 13 is to enable the operation of the valve 7 in either direction of movement of the locomotive for in the rotation of the shaft 11 in one direction, said member is shifted laterally and in the reverse direction upon movement of the shaft 11 in the opposite direction.

In order to eliminate as much as possible the friction incident to the coaction of the roller member 21 with the conical cam member 13, I have devised a slightly modified arrangement best shown in Fig. 4 wherein 14′ designates the hub of the fan to which the flanged extremity of the cam member $13^a$ is loosely connected by means of the annular attaching plate $13^b$ secured to said hub by the fastening members $13^c$. In this construction the cam member $13^a$ which is not keyed to the shaft 11, is free and does not necessarily revolve with said shaft during the operation of the mechanism.

It will be apparent that slight changes in the details and arrangement of parts may readily be made without departing from the spirit of the invention and within the scope of the appended claims.

Having thus described my invention, what I claim is:

1. Drifting valve mechanism of the class described comprising a valve operating member, a shaft, means for rotating the shaft, a fan mounted on said shaft for rotation therewith but freely shiftable longitudinally thereof, and means intermediate the valve member and the fan for actuating the former on shifting movement of said fan.

2. Drifting valve mechanism of the class described comprising a valve operating member, a shaft, means for rotating the shaft, a fan mounted on said shaft for rotation therewith but freely shiftable longitudinally thereof, and a cam member on the shaft fixed in relation to the fan for actuating the valve member on shifting movement of the fan.

3. Drifting valve mechanism of the class described comprising a valve operating member, a shaft, means for rotating said shaft, a fan mounted on said shaft for rotation therewith but freely shiftable longitudinally of said shaft, and means also shiftable on said shaft with which said valve member contacts at an intermediate point for actuating the valve member upon shifting movement thereof in either direction of movement with respect to the said valve member.

4. Drifting valve mechanism of the class described comprising a valve operating member, a support, a fan mounted on said support and shiftable transversely of the valve operating member, a cam member operatively connected to said fan and provided with oppositely arranged cam surfaces, and means for rotating said fan to cause shifting movement of the cam member and actuation of the valve operating member in either direction of movement of said cam member.

5. Drifting valve mechanism of the class described comprising a valve operating member, a cam member coöperating therewith, a shaft for said cam member, a pressure operated device mounted on the said shaft and connected to the cam member for actuating the latter to operate the valve member, and adjustable stop means on said shaft for limiting movement of the cam member.

In testimony whereof I affix my signature.

HENRY P. LETART.

Copies of this patent may be obtained for five cents each, by addressing the "Commissioner of Patents, Washington, D. C."